(12) United States Patent
Bian (10) Patent No.: US 11,181,693 B1
(45) Date of Patent: Nov. 23, 2021

(54) POLARIZATION-INSENSITIVE DIRECTIONAL COUPLERS

(71) Applicant: GLOBALFOUNDRIES U.S. Inc., Santa Clara, CA (US)

(72) Inventor: Yusheng Bian, Ballston Lake, NY (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 17/076,326

(22) Filed: Oct. 21, 2020

(51) Int. Cl.
*G02B 6/26* (2006.01)
*G02B 6/28* (2006.01)

(52) U.S. Cl.
CPC ......... *G02B 6/2843* (2013.01); *G02B 6/2852* (2013.01)

(58) Field of Classification Search
CPC .............................. G02B 6/2843; G02B 6/2852
See application file for complete search history.

(56) References Cited

U.S. PATENT DOCUMENTS

| | | | |
|---|---|---|---|
| 4,243,295 A | 1/1981 | Alferness | |
| 4,756,588 A | 7/1988 | Granestrand | |
| 5,502,783 A | 3/1996 | Wu | |
| 5,719,976 A * | 2/1998 | Henry | G02B 6/12004 385/28 |
| 6,920,266 B2 * | 7/2005 | Blume | G02B 6/1228 385/28 |
| 9,366,818 B1 * | 6/2016 | Lin | G02B 6/2804 |
| 10,795,083 B1 * | 10/2020 | Bian | G02B 6/125 |
| 2004/0081389 A1 * | 4/2004 | Soda | G02F 1/3133 385/16 |
| 2012/0321244 A1 * | 12/2012 | Suzuki | H01S 5/1014 385/14 |
| 2016/0025928 A1 * | 1/2016 | Onawa | G02B 6/14 385/14 |
| 2016/0131836 A1 * | 5/2016 | Matsumoto | G02B 6/274 385/11 |

OTHER PUBLICATIONS

M. Z. Alam, J. S. Aitchison, and M. Mojahedi, "Polarization-independent hybrid plasmonic coupler for a silicon on insulator platform," Opt. Lett. 37, 3417-3419 (2012).
Takeshi Fujisawa and Masanori Koshiba, "Polarization-independent optical directional coupler based on slot waveguides," Opt. Lett. 31, 56-58 (2006).

(Continued)

*Primary Examiner* — Ellen E Kim
(74) *Attorney, Agent, or Firm* — Thompson Hine LLP; Francois Pagette (57) ABSTRACT

Structures for a directional coupler and methods of fabricating a structure for a directional coupler. A first waveguide core has a first section, a second waveguide core has a second section laterally adjacent to the first section, a third waveguide core has a first taper, a second taper, and a third section longitudinally positioned between the first taper and the second taper, and a fourth waveguide core has a first taper, a second taper, and a fourth section longitudinally positioned between the first taper and the second taper. The fourth section is laterally adjacent to the third section, and the third section and the fourth section are positioned either over or under the first section and the second section.

20 Claims, 12 Drawing Sheets

(56) References Cited

OTHER PUBLICATIONS

Headley et al., "Polarization-independent optical racetrack resonators using rib waveguides on silicon-on-insulator", Appl. Phys. Lett. 85, 5523 (2004).
Passaro et al., "Polarization-Insensitive Directional Couplers Based on SOI Wire Waveguides", The Open Optics Journal, 2008, 2, 6-9.
Lu Liu, Qingzhong Deng, and Zhiping Zhou, "Subwavelength-grating-assisted broadband polarization-independent directional coupler," Opt. Lett. 41, 1648-1651 (2016).
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.
Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.

\* cited by examiner

POLARIZATION-INSENSITIVE DIRECTIONAL COUPLERS

BACKGROUND

The present invention relates to photonics chips and, more specifically, to structures for a directional coupler and methods of fabricating a structure for a directional coupler.

Photonics chips are used in many applications and systems including, but not limited to, data communication systems and data computation systems. A photonics chip integrates optical components, such as waveguides, optical switches, and directional couplers, and electronic components, such as field-effect transistors, into a unified platform. Among other factors, layout area, cost, and operational overhead may be reduced by the integration of both types of components on the same chip.

Directional couplers are employed on a photonics chip to split propagating optical signals between different waveguide cores. A directional coupler includes sections of the waveguide cores that are routed with a reduced lateral spacing that is selected to promote optical coupling over a given coupling length. Conventional directional couplers possess a large footprint because a large coupling length is needed to compensate for a lack of coupling strength between the waveguide cores. In addition, the splitting provided by a directional coupler may be polarization sensitive. In particular, different types of directional couplers may be needed to split optical signals polarized with the transverse electrode (TE) mode as opposed to being polarized with the transverse magnetic (TM) mode.

Improved structures for a directional coupler and methods of fabricating a structure for a directional coupler are needed.

SUMMARY

In an embodiment of the invention, a structure for a directional coupler is provided. The structure includes a first waveguide core having a first section, a second waveguide core having a second section laterally adjacent to the first section, a third waveguide core including a first taper, a second taper, and a third section longitudinally positioned between the first taper and the second taper, and a fourth waveguide core including a first taper, a second taper, and a fourth section longitudinally positioned between the first taper and the second taper. The fourth section is laterally adjacent to the third section, and the third section and the fourth section are positioned over or under the first section and the second section.

In an embodiment of the invention, a method of forming a structure for a directional coupler. The method includes forming a first waveguide core including a first section, forming a second waveguide core including a second section laterally adjacent to the first section of the first waveguide core, forming a third waveguide core including a first taper, a second taper, and a third section longitudinally positioned between the first taper and the second taper, and forming a fourth waveguide core including a first taper, a second taper, and a fourth section longitudinally positioned between the first taper and the second taper. The fourth section is laterally adjacent to the third section, and the third section and the fourth section are positioned over or under the first section and the second section.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

With reference to FIGS. 1, 2, 2A, 2B and in accordance with embodiments of the invention, a structure 10 for a directional coupler includes a waveguide core 12 and a waveguide core 14 that are both positioned over different portions of a dielectric layer 16. The structure 10 has a coupling region 18 in which a section 20 of the waveguide core 12 extends longitudinally along a longitudinal axis 13, and a section 21 of the waveguide core 14 extends longitudinally along a longitudinal axis 15. The section 20 of the waveguide core 12 may be symmetrical about the longitudinal axis 13, and the section 21 of the waveguide core 14 may be symmetrical about the longitudinal axis 15. The section 20 of the waveguide core 12 and the section 21 of the waveguide core 14 are positioned adjacent to each other in the coupling region 18. The longitudinal axis 13 of the section 20 of the waveguide core 14 in the coupling region 18 may be arranged parallel to the longitudinal axis 15 of the section 21 of the waveguide core 12 in the coupling region 18. The section 20 of the waveguide core 12 and the section 21 of the waveguide core 14 may be laterally spaced apart by an offset distance, d1, which may be measured as a lateral offset between the longitudinal axes 13, 15.

Figure 1:
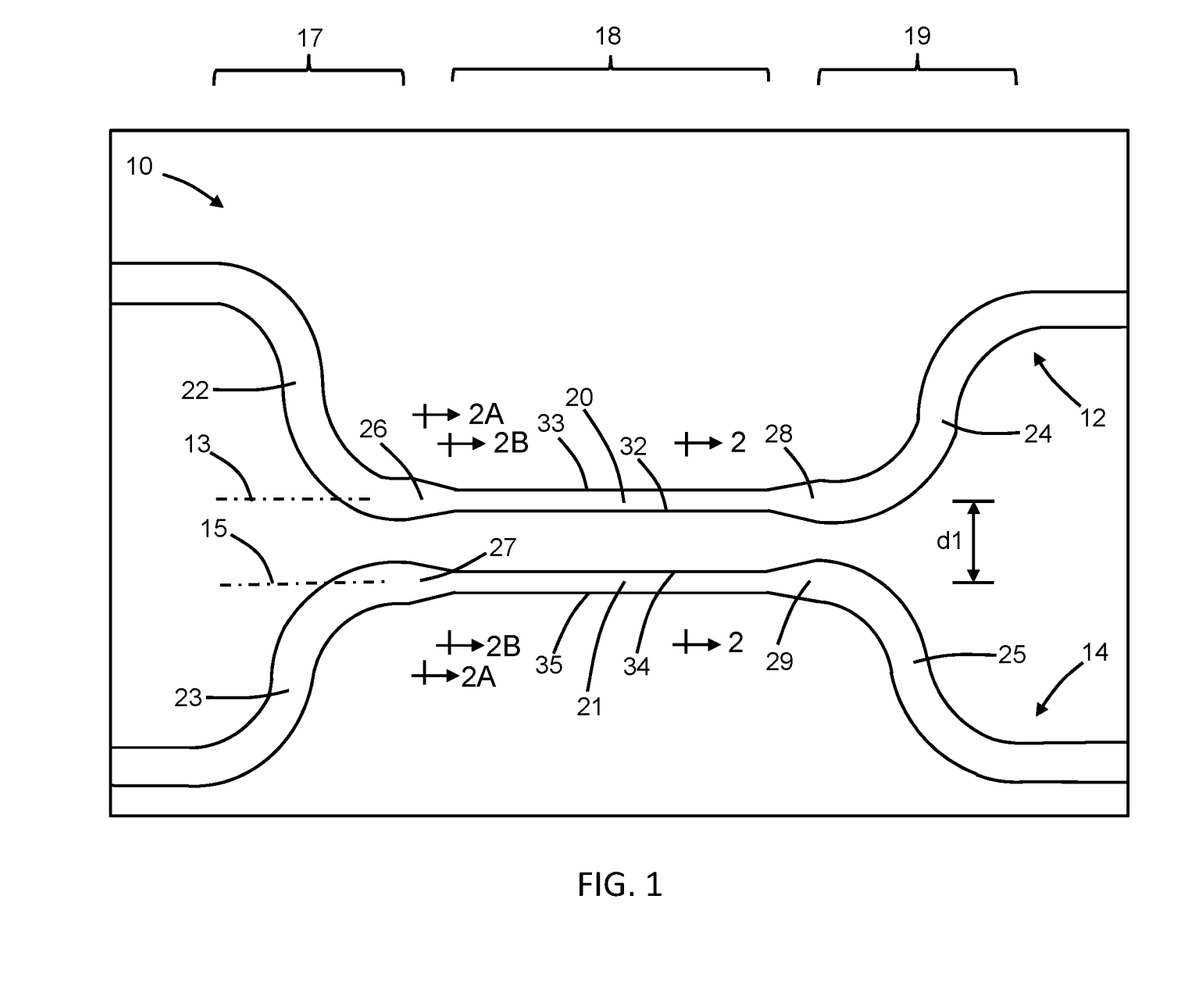
FIG. 1 is a diagrammatic top view of a structure at an initial fabrication stage of a processing method in accordance with embodiments of the invention.

The waveguide core 12 further includes a set of bends 22 in an input region 17 of the structure 10, a set of bends 24 in an output region 19 of the structure 10, a taper 26 coupling the bends 22 to the section 20, and a taper 28 coupling the section 20 to the bends 24. The section 20 is longitudinally positioned between the taper 26 and the taper 28. Similarly, the waveguide core 14 further includes a set of bends 23 in the input region 17 of the structure 10, a set of bends 25 in the output region 19 of the structure 10, a taper 27 coupling the bends 23 to the section 21, and a taper 29 coupling the section 21 to the bends 25. The section 21 is longitudinally positioned between the taper 27 and the taper 29.

The waveguide core 12 has sidewalls in the form of opposite side surfaces 32, 33 that project away from the dielectric layer 16, and the waveguide core 14 has sidewalls in the form of opposite side surfaces 34, 35 that project away from the dielectric layer 16. In the coupling region 18, the side surface 32 of the section 20 of the waveguide core 12 is arranged adjacent to the side surface 34 of the section 21 of the waveguide core 14. In an embodiment, the widths, w1, of the sections 20, 21 may be constant over their respective lengths.

The section 20 of the waveguide core 12 is laterally spaced from the section 21 of the waveguide core 14 by a smaller distance in the coupling region 18 than the distance separating the waveguide cores 12, 14 outside of the coupling region 18. In that regard, the side surface 32 of the section 20 of the waveguide core 12 may be arranged adjacent to, and aligned parallel with, the side surface 34 of the section 20 of the waveguide core 14, and the side surfaces 32 and 34 may be separated in the coupling region 18 by a gap, which may be uniform within the coupling region 18. Outside of the coupling region 18, the side surface 32 of the waveguide core 12 and the side surface 34 of the waveguide core 14 may be separated by a larger gap. The sets of bends 22, 24 in the input region 17 and the sets of bends 23, 25 in the output region 19 provide respective changes in separation between the side surface 32 of the waveguide core 12 and the side surface 34 of the waveguide core 14. Because of the larger distance between the side surfaces 32, 34 in the input region 17 and the output region 19, light coupling between the waveguide cores 12, 14 is negligible outside of the coupling region 18. The tapers 26, 27, 28, 29 may have a geometrical shape that varies over their respective lengths based on a linear function. In an alternative embodiment, the tapers 26, 27, 28, 29 may have a geometrical shape that varies over their respective lengths based on a non-linear function, such as a quadratic, parabolic, or exponential function.

Figure 2:
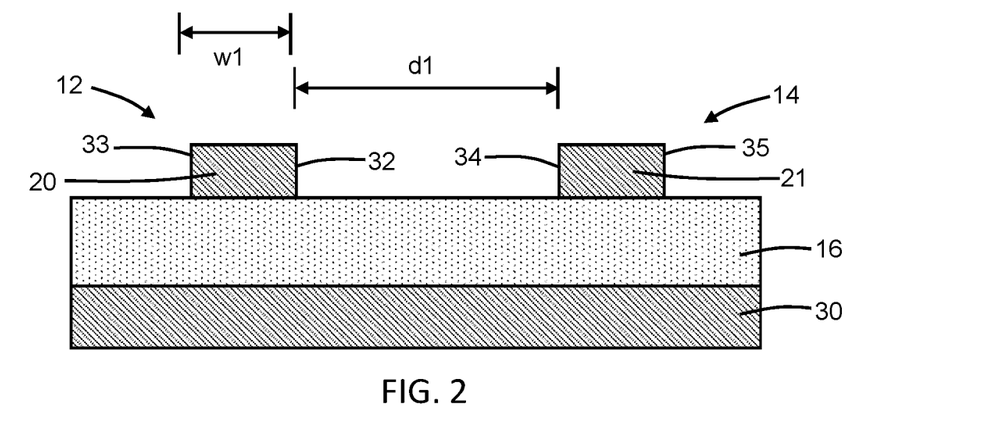
FIG. 2 is a cross-sectional view of the structure taken generally along line 2-2 in FIG. 1.
Figure 2A:
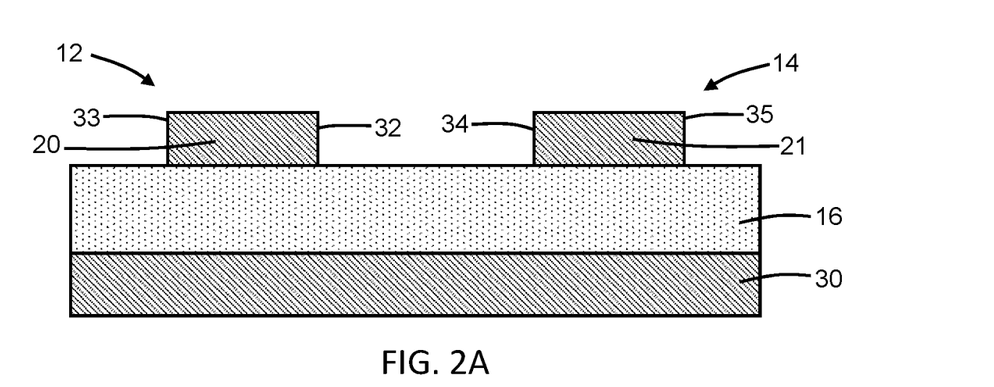
FIG. 2A is a cross-sectional view of the structure taken generally along line 2A-2A in FIG. 1.
Figure 2B:
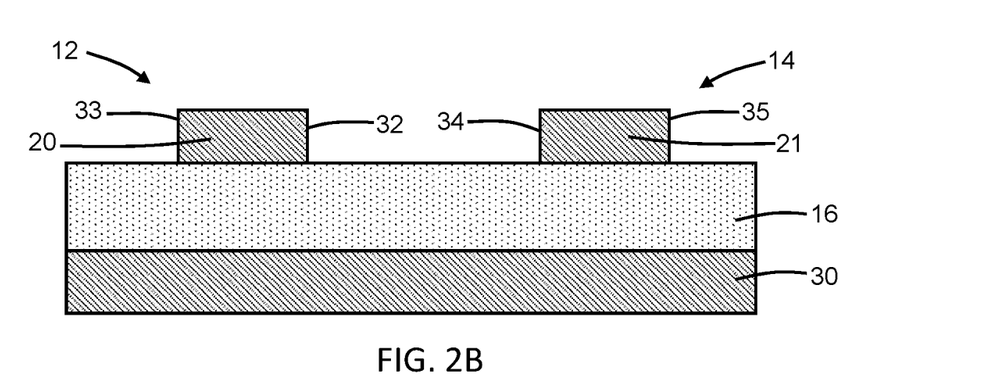
FIG. 2B is a cross-sectional view of the structure taken generally along line 2B-2B in FIG. 1.
Figure 3:
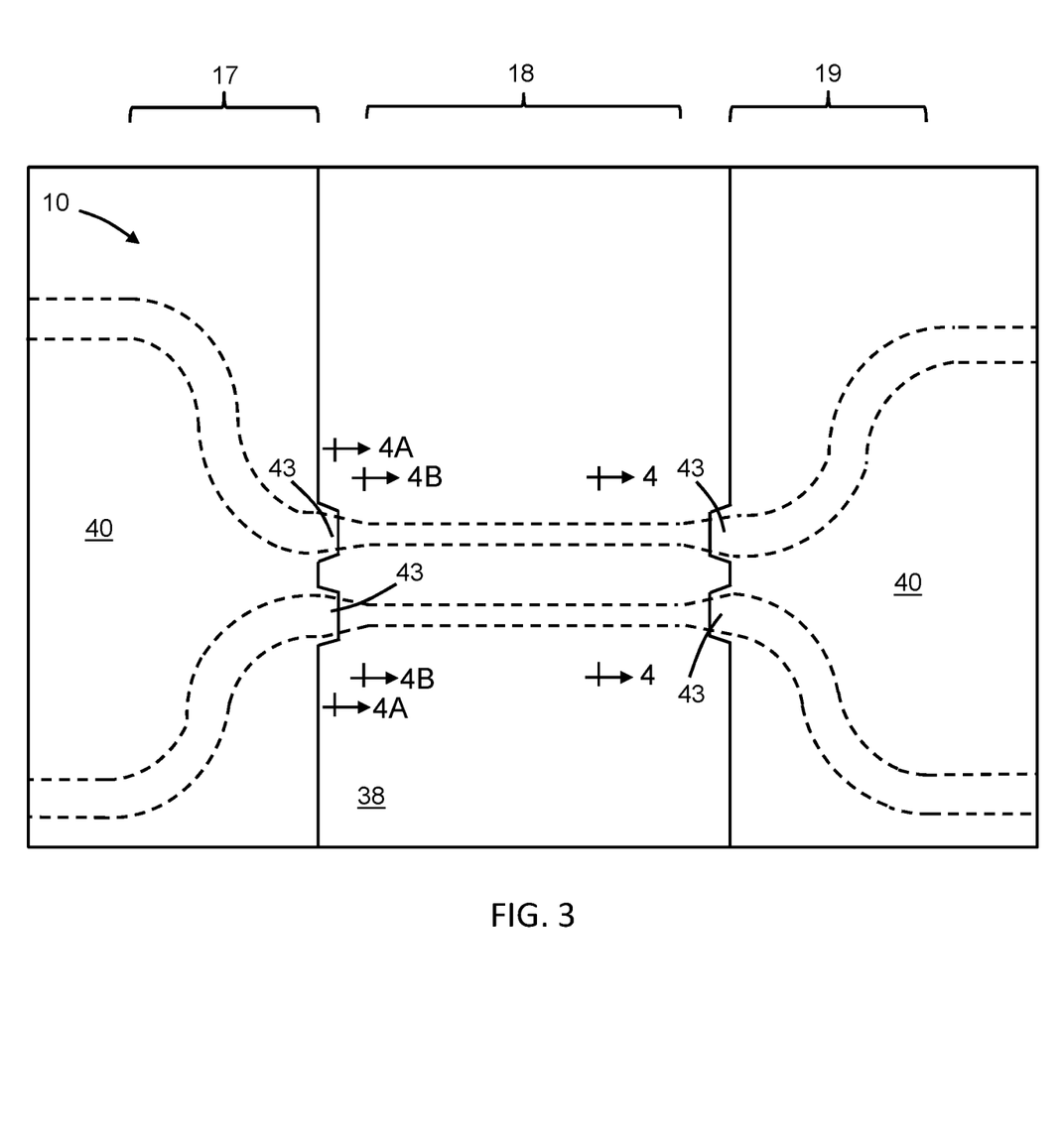
FIG. 3 is a top view of the structure at a fabrication stage subsequent to FIG. 1.
Figure 4:
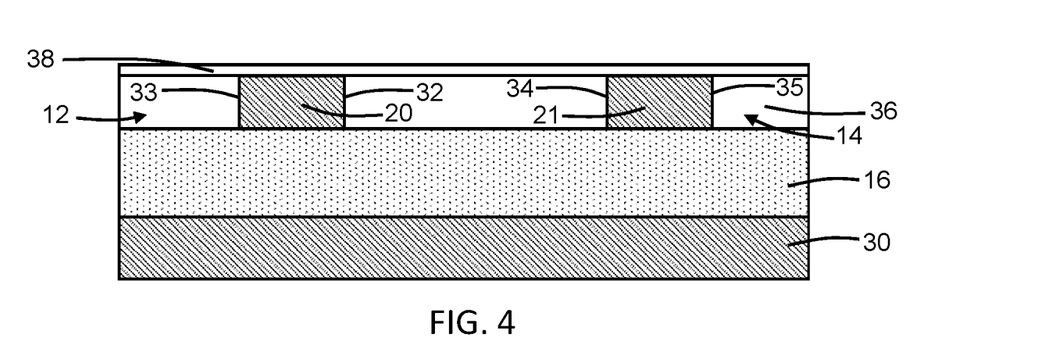
FIG. 4 is a cross-sectional view of the structure taken generally along line 4-4 in FIG. 3.
Figure 4A:
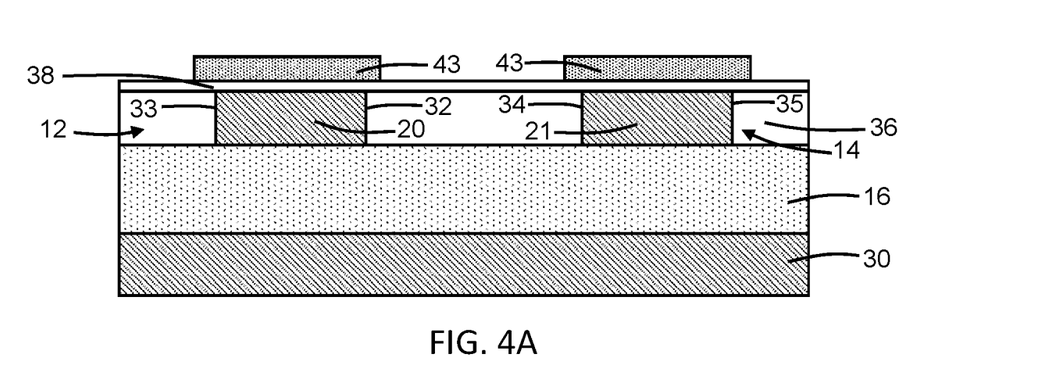
FIG. 4A is a cross-sectional view of the structure taken generally along line 4A-4A in FIG. 3.
Figure 4B:
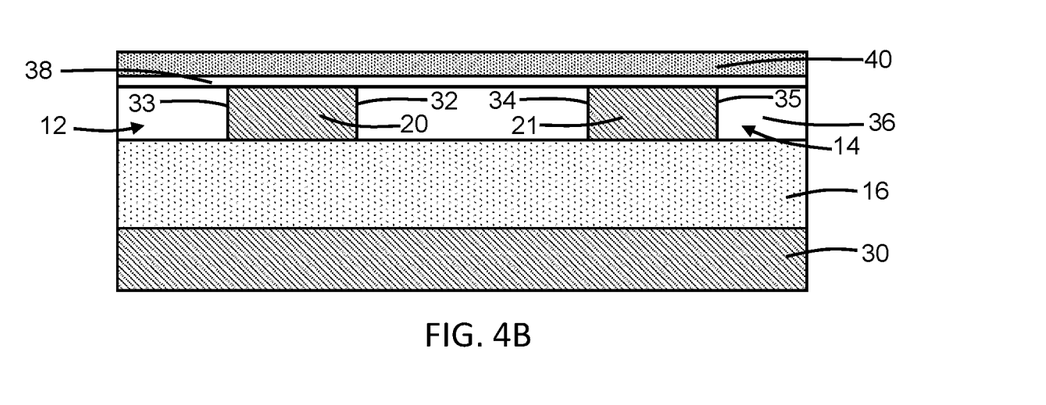
FIG. 4B is a cross-sectional view of the structure taken generally along line 4B-4B in FIG. 3.

The waveguide cores 12, 14 may be comprised of a single-crystal semiconductor material, such as single-crystal silicon. In an embodiment, the single-crystal semiconductor material may originate from a device layer of a silicon-on-insulator (SOI) substrate that further includes a buried oxide layer providing the dielectric layer 16 and a handle substrate 30 comprised of a single-crystal semiconductor material, such as single-crystal silicon, beneath the buried oxide layer. The waveguide cores 12, 14 may be patterned from the device layer by lithography and etching processes. The device layer may be fully etched to define the waveguide cores 12, 14 or, alternatively, only partially etched to define a thinned residual layer or slab on the dielectric layer 16 coupled to lower portions of the waveguide cores 12, 14. The waveguide cores 12, 14 may have coplanar or substantially coplanar top and bottom surfaces, as well as a uniform or substantially uniform thickness and a rectangular or substantially rectangular cross-sectional shape.

With reference to FIGS. 3, 4, 4A, 4B in which like reference numerals refer to like features in FIGS. 1, 2, 2A, 2B and at a subsequent fabrication stage, multiple dielectric layers 36, 38, 40 are sequentially formed to provide a layer stack over the waveguide cores 12, 14. In the layer stack, the dielectric layer 36 is arranged over the dielectric layer 16, the dielectric layer 38 is arranged over the dielectric layer 36, and the dielectric layer 40 is arranged over the dielectric layer 38. The waveguide cores 12, 14 are embedded or buried in the dielectric material of the dielectric layer 36, which acts as lateral cladding. The dielectric layer 36 may be comprised of a dielectric material, such as silicon dioxide, deposited by chemical vapor deposition and planarized with, for example, chemical mechanical polishing to remove topography. The dielectric layer 38 may be comprised of dielectric material, such as silicon dioxide, deposited by chemical vapor deposition or atomic layer deposition over the dielectric layer 36. The dielectric layer 40 may be comprised of dielectric material, such as silicon nitride, deposited by chemical vapor deposition or atomic layer deposition over the dielectric layer 38.

The dielectric layer 40 may be patterned by lithography and etching processes. In that regard, the dielectric layer 40 may be fully removed from the coupling region 18, may be masked and retained over the input region 17 and the output region 19, and may be shaped to include respective tapers 43 that are respectively positioned over the tapers 26, 27, 28, 29. The tapers 43 taper in the same direction as the tapering of the tapers 26, 28 of the waveguide core 12 and the tapers 27, 29 of the waveguide core 14. In an embodiment, the tapers 43 may be wider over their respective lengths than the tapers 26, 28 of the waveguide core 12 and the tapers 27, 29 of the waveguide core 14. The dielectric layer 40, which may have a higher refractive index than the dielectric layers 36, 38, is missing in the coupling region 18 over the section 20 of the waveguide core 12 and the section 21 of the waveguide core 14. The tapers 43 may have a geometrical shape that varies over their respective lengths based on a linear function. In an alternative embodiment, the tapers 43 may have a geometrical shape that varies over their respective lengths based on a non-linear function, such as a quadratic, parabolic, or exponential function.

With reference to FIGS. 5, 6, 6A, 6B in which like reference numerals refer to like features in FIGS. 3, 4, 4A, 4B and at a subsequent fabrication stage, a dielectric layer 41 is formed over the patterned dielectric layer 40. The dielectric layer 41 may be comprised of dielectric material, such as silicon dioxide, deposited by chemical vapor deposition or atomic layer deposition over the dielectric layer 40 and planarized with, for example, chemical mechanical polishing to remove topography.

Waveguide cores 42, 44 are formed on the dielectric layer 41. The waveguide cores 42, 44 may be formed from a layer containing a dielectric material that is deposited by chemical vapor deposition or atomic layer deposition on the dielectric layer 41 and then patterned with lithography and etching processes. The etching process may be selected to stop on the dielectric material of the dielectric layer 41. The patterned layer may be fully etched to define the waveguide cores 42, 44 or, alternatively, only partially etched to define a thinned residual layer or slab on the dielectric layer 41 coupled to lower portions of the waveguide cores 42, 44. In an embodiment, the waveguide cores 42, 44 may be positioned in direct contact with the dielectric layer 41. The dielectric material constituting the waveguide cores 42, 44 may have a refractive index that differs from the refractive index of the semiconductor material constituting the waveguide cores 12, 14. In an embodiment, the dielectric material constituting the waveguide cores 42, 44 may be silicon nitride. The waveguide cores 42, 44 may have coplanar or substantially coplanar top and bottom surfaces, as well as a uniform or substantially uniform thickness and a rectangular or substantially rectangular cross-sectional shape. The tapers 48, 49, 50, 51 may have a cross-sectional shape that varies over their respective lengths based on a linear function. In an alternative embodiment, the tapers 48, 49, 50, 51 may have a cross-sectional shape that varies over their respective lengths based on a non-linear function, such as a quadratic, parabolic, or exponential function.

Figure 5:
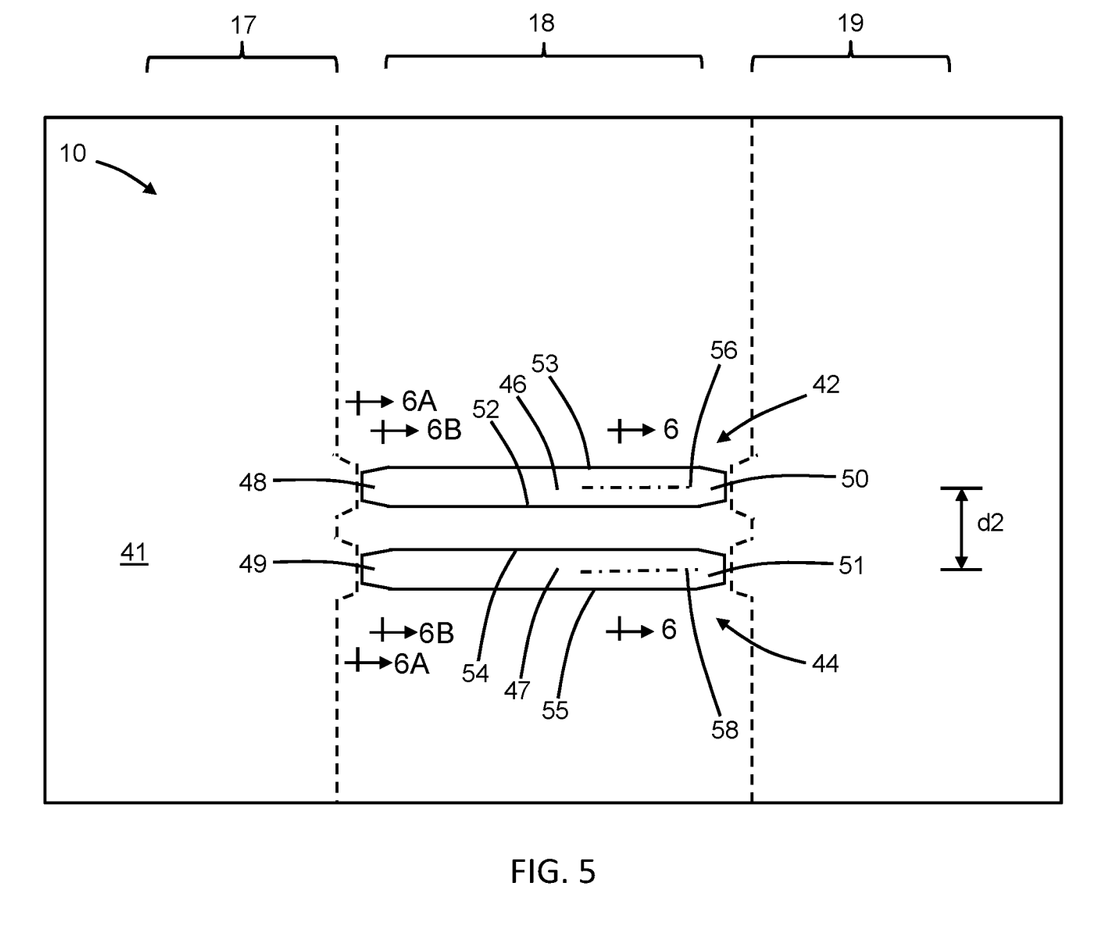
FIG. 5 is a cross-sectional view of the structure at a fabrication stage subsequent to FIG. 3.
Figure 6:
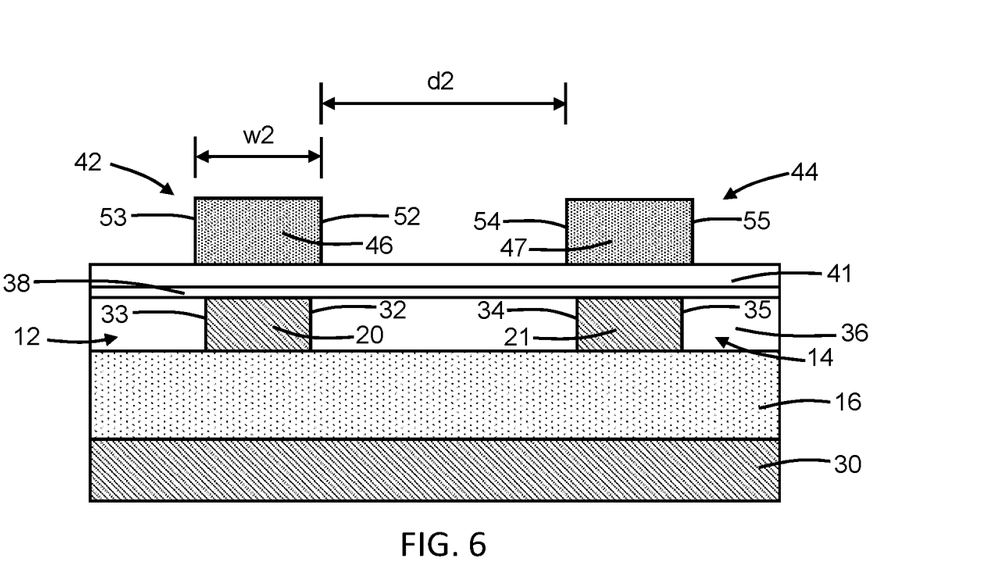
FIG. 6 is a cross-sectional view of the structure taken generally along line 6-6 in FIG. 5.
Figure 6A:
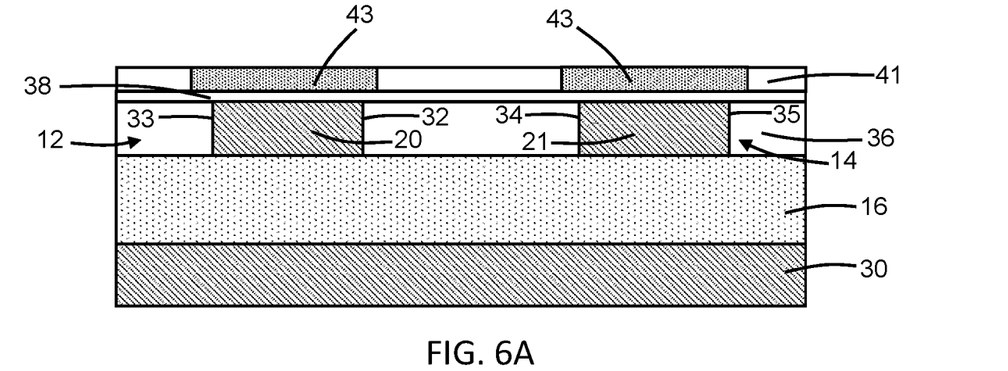
FIG. 6A is a cross-sectional view of the structure taken generally along line 6A-6A in FIG. 5.
Figure 6B:
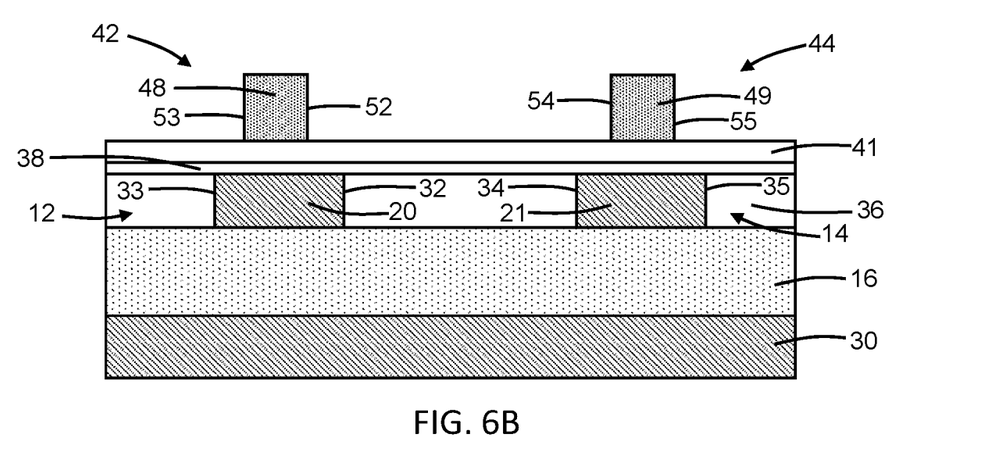
FIG. 6B is a cross-sectional view of the structure taken generally along line 6B-6B in FIG. 5.

The waveguide cores 42, 44 are patterned to have truncated geometrical shapes with opposite terminating ends, and their truncated geometrical shapes may be either identically shaped or substantially identically shaped. The waveguide core 42 includes a section 46 that is positioned in the coupling region 18 over and above the section 20 of the waveguide core 12 and tapers 48, 50 that terminate opposite ends of the section 46. In an embodiment, the section 46 of the waveguide core 42 may be positioned directly over the section 20 of the waveguide core 12 with an overlap. The waveguide core 44 includes a section 47 that is positioned in the coupling region 18 over and above the section 21 of the waveguide core 14 and tapers 49, 51 that terminate opposite ends of the section 47. In an embodiment, the section 47 of the waveguide core 44 may be positioned directly over the section 21 of the waveguide core 14 with an overlap.

The taper 48 at one end of the waveguide core 42 is positioned over and above a portion of the taper 26 of the waveguide core 12, and one of the tapers 43 may be positioned above a portion of the taper 26 over which the taper 48 is absent. The taper 50 at the opposite end of the waveguide core 42 is positioned over and above a portion of the taper 28 of the waveguide core 12, and one of the tapers 43 may be positioned above a portion of the taper 28 over which the taper 50 is absent. In an embodiment, the tapers 43 may be non-overlapping with the tapers 48, 50. In an embodiment, the tapers 43 may be non-overlapping with the tapers 48, 50 and may be spaced by a small gap from the tapers 48, 50. In an embodiment, the tapers 43 may be non-overlapping with the tapers 48, 50 and coextensive with the tapers 48, 50 at their respective tips. In an embodiment, the taper 48 is positioned directly over a portion of the taper 26 of the waveguide core 12, and the taper 50 is positioned directly over a portion of the taper 28 of the waveguide core 12. As used herein, the terms "directly over" and "directly under" mean lateral positioning in different planes with full or substantially full overlap.

The taper 49 at one end of the waveguide core 44 is positioned over and above the taper 27 of the waveguide core 14, and one of the tapers 43 may be positioned above a portion of the taper 27 over which the taper 49 is absent. The taper 51 at the opposite end of the waveguide core 44 is positioned over and above the taper 29 of the waveguide core 14, and one of the tapers 43 may be positioned above a portion of the taper 29 over which the taper 51 is absent. In an embodiment, the tapers 43 may be non-overlapping with the tapers 49, 51. In an embodiment, the tapers 43 may be non-overlapping with the tapers 49, 51 and may be spaced by a small gap from the tapers 49, 51. In an embodiment, the tapers 43 may be non-overlapping with the tapers 49, 51 and coextensive with the tapers 49, 51 at their respective tips. In an embodiment, the taper 49 is positioned directly over a portion of the taper 27 of the waveguide core 14, and the taper 51 is positioned directly over a portion of the taper 29 of the waveguide core 14.

The waveguide core 42 includes sidewalls in the form of opposite side surfaces 52, 53 that project away from the dielectric layer 41, and the waveguide core 44 includes sidewalls in the form of opposite side surfaces 54, 55 that project away from the dielectric layer 41. The side surface 52 of the section 46 of the waveguide core 42 is arranged in the coupling region 18 adjacent to the side surface 54 of the section 47 of the waveguide core 44. In an embodiment, the widths, w2, of the sections 46, 47 may be constant over their respective lengths and may be greater than the respective widths, w1, of the sections 20, 21 (FIG. 2). In an embodiment, the waveguide cores 42, 44 and the waveguide cores 12, 14 may have equal thicknesses. In an embodiment, the waveguide cores 42, 44 and the waveguide cores 12, 14 may have unequal thicknesses.

The section 46 of the waveguide core 42 extends longitudinally along a longitudinal axis 56, and the section 47 of the waveguide core 44 extends longitudinally along a longitudinal axis 58. The section 46 is longitudinally positioned between the taper 48 and the taper 50, and the section 47 is longitudinally positioned between the taper 49 and the taper 51. The longitudinal axis 56 of the waveguide core 42 may be arranged parallel to the longitudinal axis 58 of the waveguide core 44. The section 46 of the waveguide core 42 is laterally spaced from the section 47 of the waveguide core 44. In that regard, the side surface 52 of the section 46 of the waveguide core 42 may be arranged adjacent to, and aligned parallel with, the side surface 54 of the section 47 of the waveguide core 44, and the side surfaces 52 and 54 may be separated in the coupling region 18 by a gap, which may be uniform within the coupling region 18.

The waveguide cores 42, 44 may be laterally spaced apart by an offset distance, d2, which may be measured as a lateral offset between the longitudinal axes 56, 58. The waveguide cores 42, 44, which respectively terminate at their opposite ends, are absent in the input region 17 and output region 19. The offset distance, d2, may be equal to substantially equal to the offset distance, d1 (FIG. 1). In an embodiment, the waveguide core 42 may be centered or substantially centered over the waveguide core 12, and the waveguide core 44 may be centered or substantially centered over the waveguide core 14.

Figure 7:
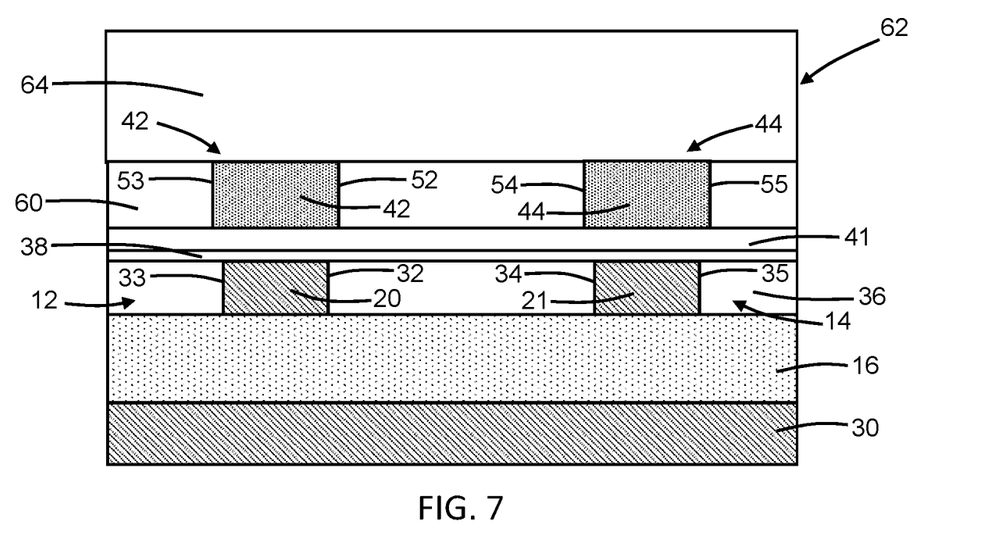
FIG. 7 is a cross-sectional view of the structure at a fabrication stage subsequent to FIG. 6.

With reference to FIG. 7 in which like reference numerals refer to like features in FIG. 6 and at a subsequent fabrication stage, a dielectric layer 60 of a contact level is formed by middle-of-line processing over the waveguide cores 42, 44. The dielectric layer 60 may be composed of dielectric material, such as silicon dioxide, deposited by chemical vapor deposition using ozone and tetraethylorthosilicate (TEOS) as reactants. In the representative embodiment, the waveguide cores 42, 44 are embedded in the dielectric material of the dielectric layer 60.

A back-end-of-line stack, generally indicated by reference numeral 62, is formed by back-end-of-line (BEOL) processing over the dielectric layer 60 and the structure 10. The back-end-of-line stack 62 may include one or more interlayer dielectric layers 64 composed of one or more dielectric materials, such as silicon dioxide.

Figure 8:
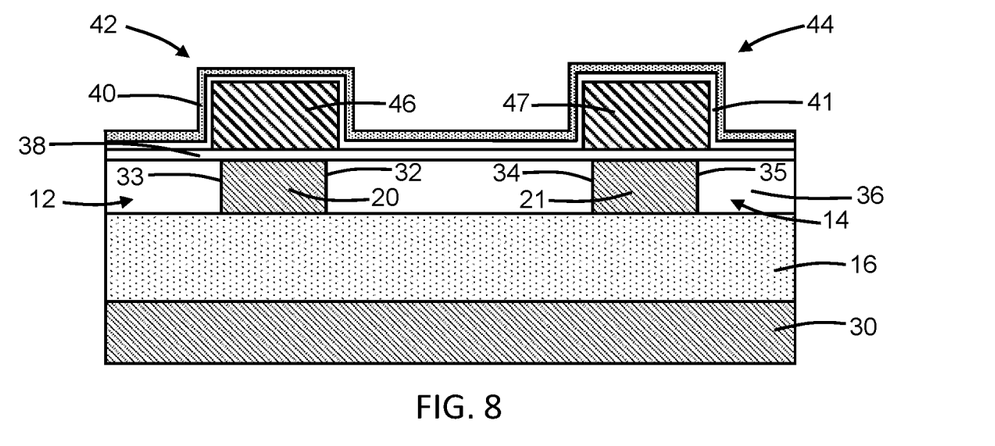
FIGS. 8, 8A, 8B are cross-sectional views of a structure in accordance with alternative embodiments of the invention.
Figure 8A:
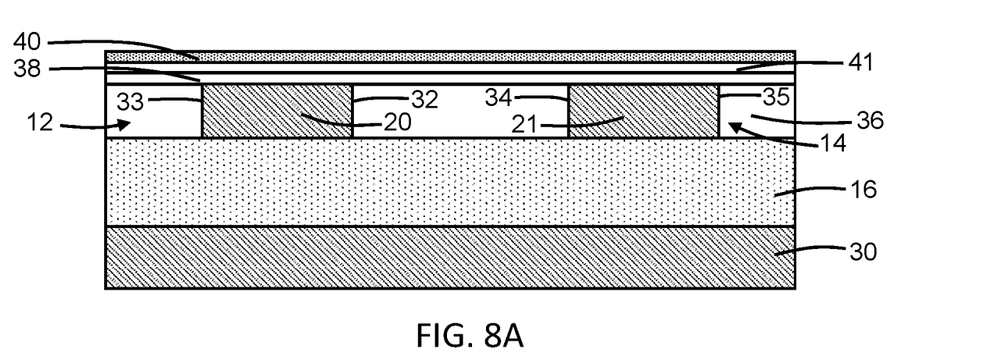
Figure 8B:
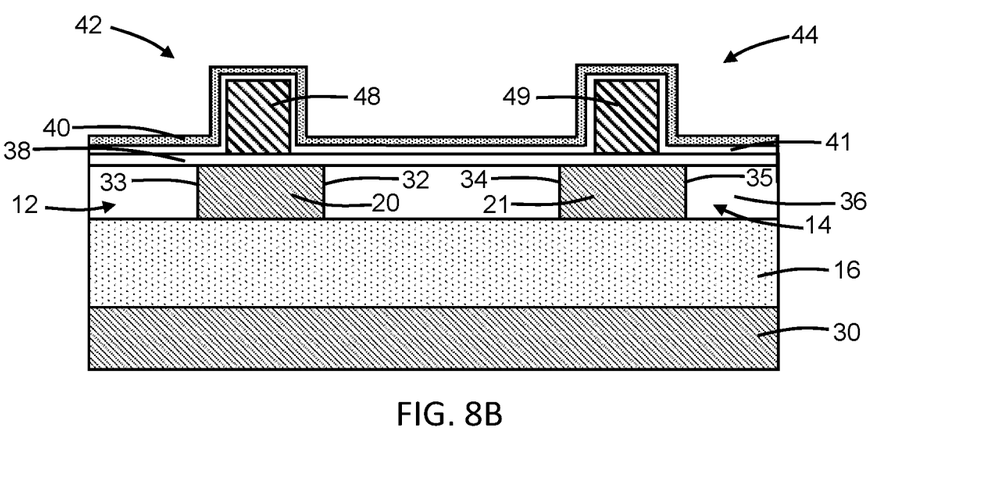

With reference to FIGS. 8, 8A, 8B and in accordance with alternative embodiments of the invention, the waveguide cores 42, 44 of the structure 10 may be comprised of a material that is not a dielectric material. In an embodiment, the waveguide cores 42, 44 may be formed from a polycrystalline semiconductor material, such as polycrystalline silicon (i.e., polysilicon), that is deposited in a layer on the dielectric layer 38 and then patterned to shape with lithography and etching processes. The etching process forming the waveguide cores 42, 44 may be selected to stop on the dielectric material of the dielectric layer 38. The dielectric layers 40 and 41 are formed, in a reverse order, after the waveguide core 44 is patterned. For that reason, the dielectric layers 40 and 41 overlap with the waveguide cores 42, 44. The dielectric layer 38 is not patterned and, for that reason, the dielectric layer 38 is present in the coupling region 18, as well as in other regions of the structure 10.

Figure 9:
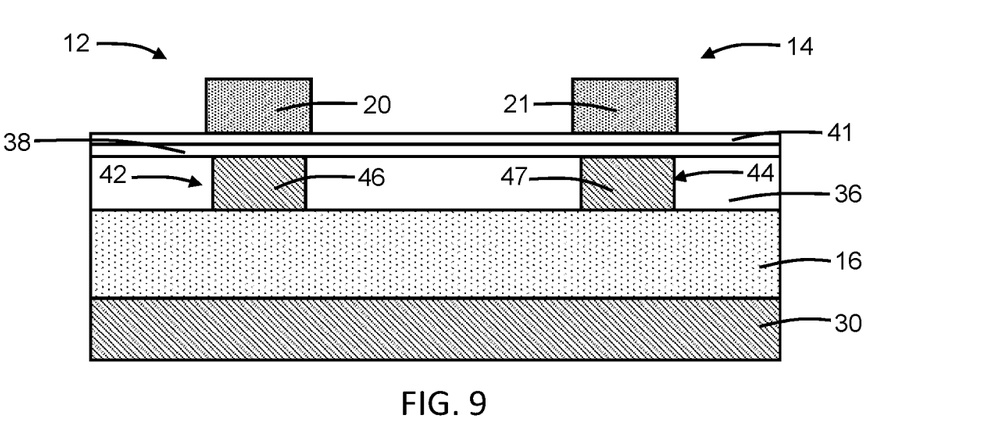
FIGS. 9, 9A, 9B are cross-sectional views of a structure in accordance with alternative embodiments of the invention.
Figure 9A:
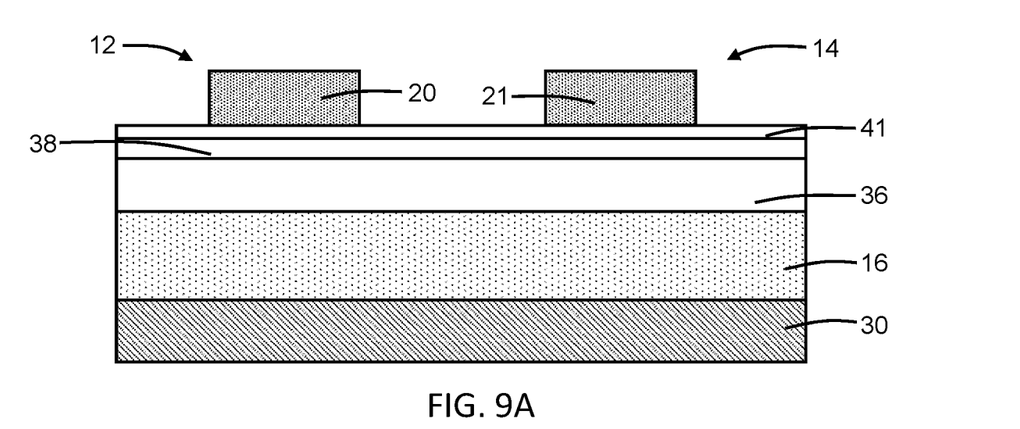
Figure 9B:
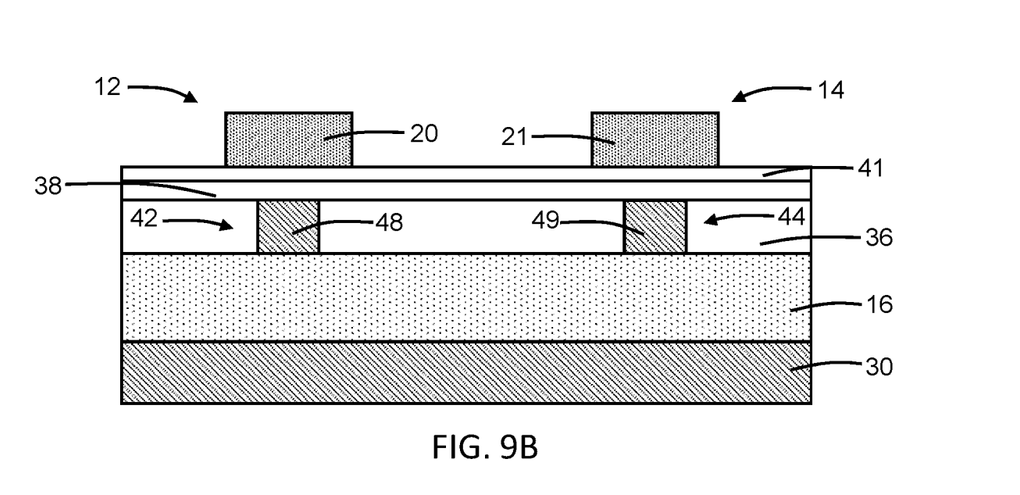

With reference to FIGS. 9, 9A, 9B and in accordance with alternative embodiments of the invention, the structure 10 may be modified such that the waveguide cores 42, 44 are positioned under and below the waveguide cores 12, 14, and the materials forming the waveguide cores 12, 14 and the waveguide cores 42, 44 may be exchanged. For example, the waveguide cores 12, 14 may be comprised of dielectric material, such as silicon nitride, that is deposited on the dielectric layer 38 and patterned with lithography and etching processes, and the waveguide cores 42, 44 may be comprised of single-crystal semiconductor material, such as the single-crystal semiconductor material of the device layer of an SOI wafer, that is patterned with lithography and etching processes. In the representative embodiment, the dielectric layer 38 is omitted from the structure 10.

Figure 10:
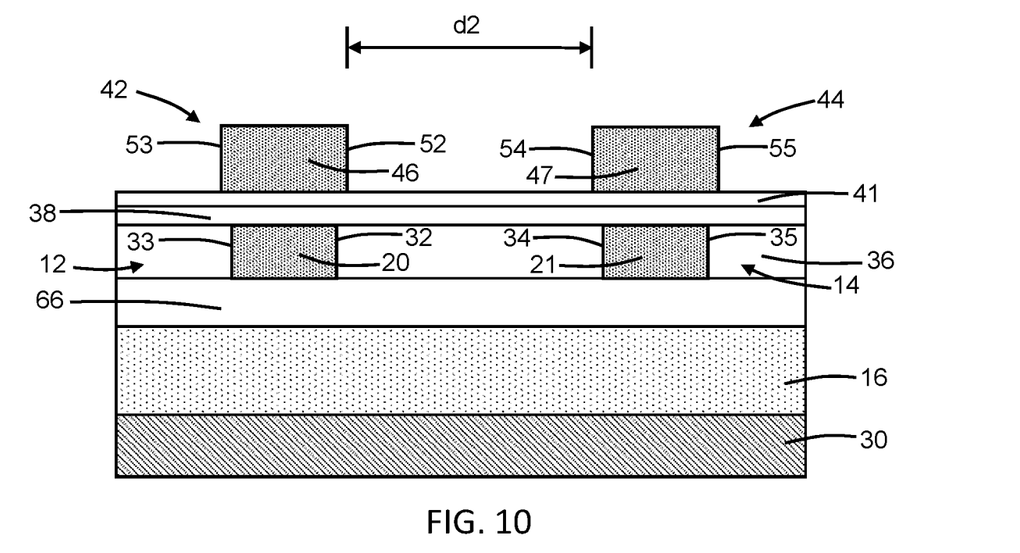
FIGS. 10, 10A, 10B are cross-sectional views of a structure in accordance with alternative embodiments of the invention.
Figure 10A:
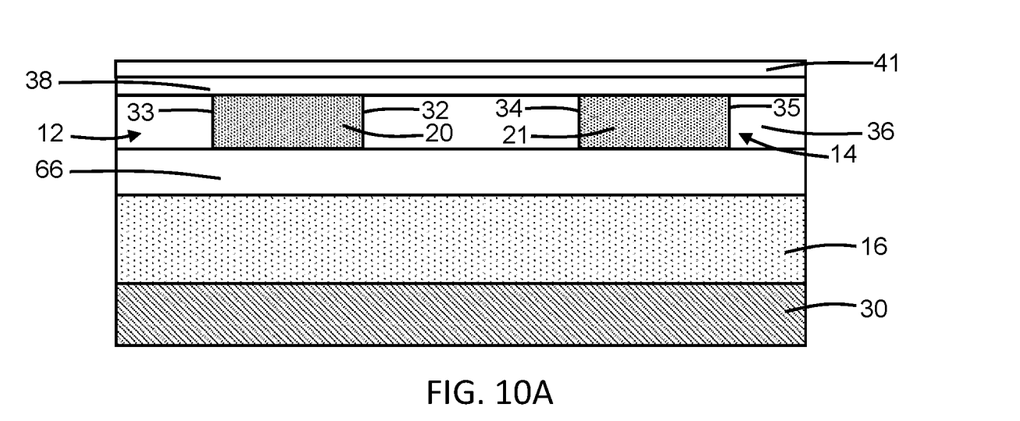
Figure 10B:
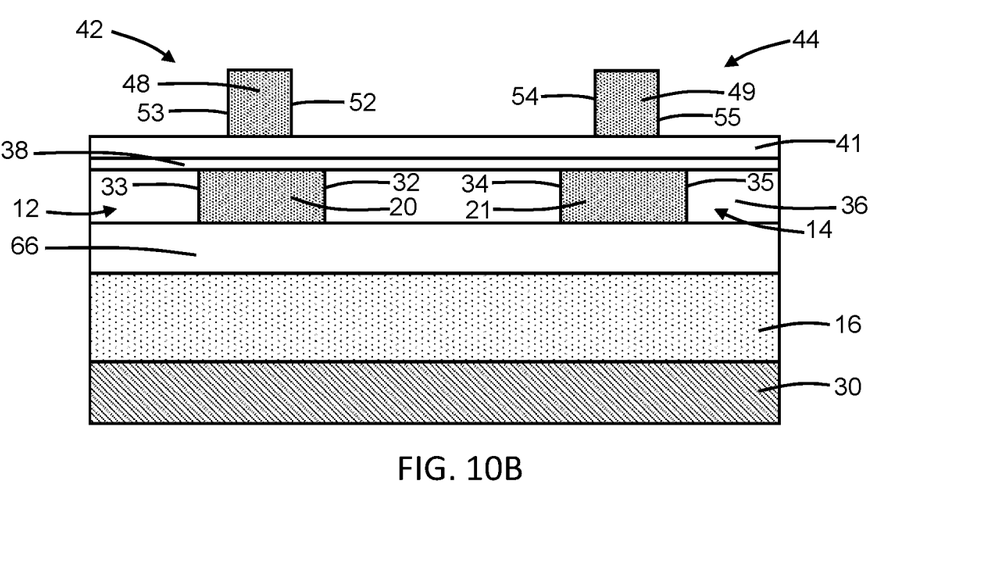

With reference to FIGS. 10, 10A, 10B and in accordance with alternative embodiments of the invention, the structure 10 may be modified such that neither the waveguide cores 12, 14 nor the waveguide cores 42, 44 are comprised of single-crystal semiconductor material. For example, the waveguide cores 12, 14 may be comprised of a dielectric material, such as silicon nitride, that is deposited on the dielectric layer 38 and patterned with lithography and etching processes, and the waveguide cores 42, 44 may be comprised of a dielectric material, such as silicon nitride, that is deposited on the dielectric layer 38 and patterned with lithography and etching processes. A dielectric layer 66, which may be comprised of silicon dioxide, may be formed over the waveguide cores 12, 14 before the waveguide cores 42, 44 are formed. In an alternative embodiment, the waveguide cores 12, 14 may be formed over and above the waveguide cores 42, 44 instead of under and below the waveguide cores 42, 44.

Figure 11:
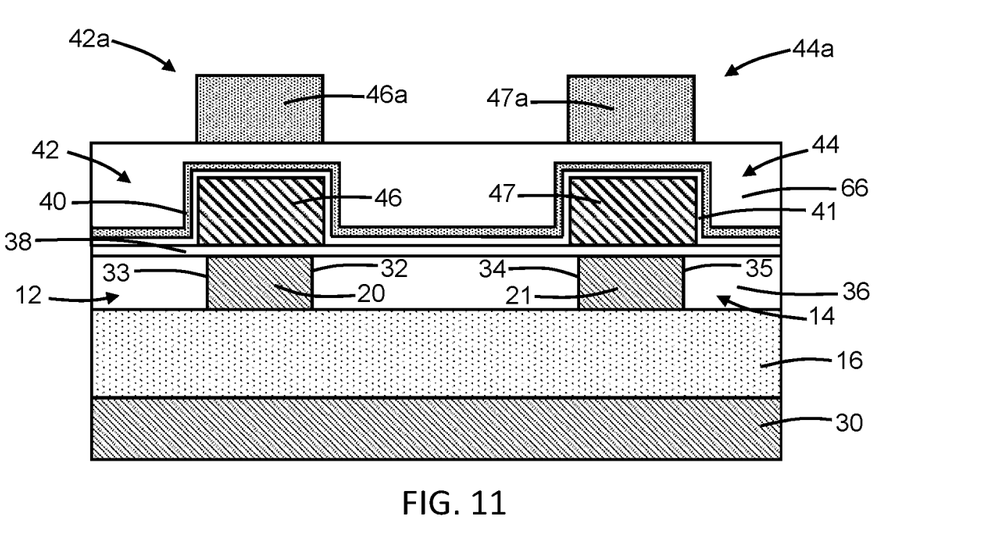
FIG. 11 is a cross-sectional view of a structure in accordance with alternative embodiments of the invention.

With reference to FIG. 11 and in accordance with alternative embodiments of the invention, the structure 10 may be modified to include more than two sets of stacked waveguide cores within the coupling region 18. For example, the structure 10 of FIGS. 8, 8A, 8B may be modified to add a waveguide core 42a over the waveguide core 42 and a waveguide core 44a over the waveguide core 44. The waveguide cores 42a, 44a may be geometrically shaped similar to identical to the geometrical shapes of the waveguide cores 42, 44. In that regard, the waveguide cores 42a, 44a may be truncated with tapers similar to waveguide cores 42, 44 and may include respective sections 46a, 47a that are positioned over and above the sections 46, 47 of the waveguide cores 42, 44. In an embodiment, the section 46a may be respectively positioned directly over and above the section 46 of the waveguide core 42 and the section 20 of the waveguide core 12. In an embodiment, the section 47a may be respectively positioned directly over and above the section 47 of the waveguide core 44 and the section 21 of the waveguide core 14. In an embodiment, the added waveguide cores 42a, 44a may be comprised of silicon nitride. In alternative embodiments, the added waveguide cores 42a, 44a may be comprised of a different material. In alternative embodiments, two or more of the pairs of the waveguide cores 12, 14, waveguide cores 42, 44, and waveguide cores 42a, 44a may be comprised of the same material.

The structure 10, in any of its embodiments described herein, may be integrated into a photonics chip that includes electronic components and additional optical components formed on the same chip. For example, the electronic components may include field-effect transistors that are fabricated by CMOS front-end-of-line (FEOL) processing.

The structure 10, in any of its embodiments described herein, may function as a directional coupler without polarization sensitivity. In that regard, the structure 10 may be used to split, or combine, optical signals propagating with either the transverse electric (TE) mode or the transverse magnetic (TM) mode by matching the coupling lengths and coupling efficiencies of both TE and TM modes. As a result, the polarization-insensitive structure 10 may be used on a photonics chip to split, or combine, optical signals propagating with the transverse electric (TE) mode or optical signals propagating with the transverse magnetic (TM) mode.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or "in direct contact with" another feature if intervening features are absent. A feature may be "indirectly on" or "in indirect contact with" another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a directional coupler, the structure comprising:
   a first waveguide core including a first section;
   a second waveguide core including a second section laterally adjacent to the first section;
   a third waveguide core including a first taper, a second taper, and a third section longitudinally positioned between the first taper and the second taper; and
   a fourth waveguide core including a first taper, a second taper, and a fourth section longitudinally positioned between the first taper and the second taper, the fourth section laterally adjacent to the third section,
   wherein the third section is positioned directly over the first section, and the fourth section is positioned directly over the second section.

2. The structure of claim 1 wherein the first waveguide core and the second waveguide core are comprised of a first material, and the third waveguide core and the fourth waveguide core are comprised of a second material having a different composition than the first material.

3. The structure of claim 1 wherein the first waveguide core and the second waveguide core are comprised of a material, and the third waveguide core and the fourth waveguide core are comprised of the material.

4. The structure of claim 1 wherein the first taper of the third waveguide core terminates a first end of the third section, the second taper of the third waveguide core terminates a second end of the third section, the first taper of the fourth waveguide core terminates a first end of the fourth section, and the second taper of the fourth waveguide core terminates a second end of the fourth section.

5. The structure of claim 1 wherein the first waveguide core includes a first taper connected to a first end of the first section and a second taper connected to a second end of the first section, and the second waveguide core includes a first taper connected to a first end of the second section and a second taper connected to a second end of the second section.

6. The structure of claim 5 wherein the first taper of the third waveguide core is positioned directly over a portion of the first taper of the first waveguide core, the second taper of the third waveguide core is positioned directly over a portion of the second taper of the first waveguide core, the first taper of the fourth waveguide core is positioned directly over a portion of the first taper of the second waveguide core, and the second taper of the fourth waveguide core is positioned over directly over a portion of the second taper of the second waveguide core.

7. The structure of claim 5 wherein the first waveguide core includes a first plurality of bends coupled by the first taper of the first waveguide core to the first section, the second waveguide core includes a second plurality of bends coupled by the first taper of the second waveguide core to the second section, and further comprising:
   a dielectric layer over the first plurality of bends and the second plurality of bends, the dielectric layer including a first taper between the first taper of the first waveguide core and the first taper of the third waveguide core, and the dielectric layer including a second taper between the first taper of the second waveguide core and the first taper of the fourth waveguide core.

8. The structure of claim 7 wherein the dielectric layer is comprised of a material, and the third waveguide core and the fourth waveguide core are comprised of the material.

9. A structure for a directional coupler, the structure comprising:
   a first waveguide core including a first section;
   a second waveguide core including a second section laterally adjacent to the first section;
   a third waveguide core including a first taper, a second taper, and a third section longitudinally positioned between the first taper and the second taper; and
   a fourth waveguide core including a first taper, a second taper, and a fourth section longitudinally positioned between the first taper and the second taper, the fourth section laterally adjacent to the third section,
   wherein the third section is positioned directly under the first section, and the fourth section is positioned directly under the second section.

10. The structure of claim 9 wherein the first waveguide core includes a first taper connected to a first end of the first section and a second taper connected to a second end of the first section, and the second waveguide core includes a first taper connected to a first end of the second section and a second taper connected to a second end of the second section.

11. The structure of claim 10 wherein the first taper of the third waveguide core is positioned directly under the first taper of the first waveguide core, the second taper of the third waveguide core is positioned directly under the second taper of the first waveguide core, the first taper of the fourth waveguide core is positioned directly under the first taper of the second waveguide core, and the second taper of the fourth waveguide core is positioned directly under the second taper of the second waveguide core.

12. The structure of claim 1 wherein the third section and the fourth section are laterally spaced apart by a first center-to-center distance, the first section and the second section are laterally spaced apart by a second center-to-center distance, and the first center-to-center distance is substantially equal to the second center-to-center distance.

13. The structure of claim 1 wherein the first taper of the third waveguide core is directly connected to a first end of the third section, the second taper of the third waveguide core is directly connected to a second end of the third section, the first taper of the fourth waveguide core is directly connected to a first end of the fourth section, and the second taper of the fourth waveguide core is directly connected to a second end of the fourth section.

14. The structure of claim 9 wherein the first taper of the third waveguide core terminates a first end of the third section, the second taper of the third waveguide core terminates a second end of the third section, the first taper of the fourth waveguide core terminates a first end of the fourth section, and the second taper of the fourth waveguide core terminates a second end of the fourth section.

15. A method of forming a structure for a directional coupler, the method comprising:
   forming a first waveguide core including a first section;
   forming a second waveguide core including a second section laterally adjacent to the first section of the first waveguide core;
   forming a third waveguide core including a first taper, a second taper, and a third section longitudinally positioned between the first taper and the second taper; and forming a fourth waveguide core including a first taper, a second taper, and a fourth section longitudinally positioned between the first taper and the second taper, wherein the third section is positioned directly over the first section, and the fourth section is positioned directly over the second section.

16. The method of claim 15 wherein the first taper of the third waveguide core terminates a first end of the third section, the second taper of the third waveguide core terminates a second end of the third section, the first taper of the fourth waveguide core terminates a first end of the fourth section, and the second taper of the fourth waveguide core terminates a second end of the fourth section.

17. The structure of claim 9 wherein the first waveguide core and the second waveguide core are comprised of a first material, and the third waveguide core and the fourth waveguide core are comprised of a second material having a different composition than the first material.

18. The structure of claim 9 wherein the first waveguide core and the second waveguide core are comprised of a first material, and the third waveguide core and the fourth waveguide core are comprised of the first material.

19. The structure of claim 9 wherein the third section and the fourth section are laterally spaced apart by a first center-to-center distance, the first section and the second section are laterally spaced apart by a second center-to-center distance, and the first center-to-center distance is substantially equal to the second center-to-center distance.

20. The structure of claim 9 wherein the first taper of the third waveguide core is directly connected to a first end of the third section, the second taper of the third waveguide core is directly connected to a second end of the third section, the first taper of the fourth waveguide core is directly connected to a first end of the fourth section, and the second taper of the fourth waveguide core is directly connected to a second end of the fourth section.

* * * * *